United States Patent [19]
Mokeddem

[11] Patent Number: 5,829,319
[45] Date of Patent: Nov. 3, 1998

[54] MAGNETO-RHEOLOGICAL TORSIONAL VIBRATION DAMPER

[75] Inventor: Mohamed Mokeddem, Cheektowaga, N.Y.

[73] Assignee: Vibratech, Inc., Alden, N.Y.

[21] Appl. No.: 725,706

[22] Filed: Oct. 4, 1996

[51] Int. Cl.⁶ ................................ F16F 9/00; F16F 15/16
[52] U.S. Cl. ........................... 74/574; 74/573 F; 188/267
[58] Field of Search .................. 74/574, 573 F, 74/572; 188/267, 267.2

[56] References Cited

U.S. PATENT DOCUMENTS

| | | |
|---|---|---|
| 1,962,367 | 6/1934 | Smythe . |
| 2,514,136 | 7/1950 | O'Connor . |
| 2,724,983 | 11/1955 | O'Connor . |
| 3,462,136 | 8/1969 | Rumsey . |
| 3,552,230 | 1/1971 | McLean . |
| 3,603,172 | 9/1971 | Hall . |
| 3,955,400 | 5/1976 | Parker .................................. 74/574 X |
| 5,007,303 | 4/1991 | Okuzumi .............................. 74/572 X |
| 5,165,506 | 11/1992 | Guimbretiere . |
| 5,277,281 | 1/1994 | Carlson et al. . |
| 5,398,917 | 3/1995 | Carlson et al. . |
| 5,452,957 | 9/1995 | Duggan . |
| 5,542,507 | 8/1996 | Warchocki et al. . |

FOREIGN PATENT DOCUMENTS

| | | | |
|---|---|---|---|
| 2579283 | 9/1986 | France ...................... 74/574 |
| 80542 | 7/1981 | Japan ..................... 74/573 F |
| 149646 | 7/1986 | Japan ....................... 74/572 |
| 3292435 | 12/1991 | Japan ....................... 74/574 |
| 875130 | 10/1981 | U.S.S.R. .................... 74/572 |
| 1307126 | 4/1987 | U.S.S.R. .................... 74/574 |
| 1326816 | 7/1987 | U.S.S.R. .................... 74/574 |
| 1721335 | 3/1992 | U.S.S.R. .................. 74/573 F |

*Primary Examiner*—Charles A. Marmor
*Assistant Examiner*—Mary Ann Battista
*Attorney, Agent, or Firm*—Hill & Simpson

[57] ABSTRACT

An apparatus for, and a method of, controlling the torsional damping frequency of a torsional damper using a magneto-rheological fluid disposed between a relatively rotating inertia ring and a surrounding chamber. A coil is continuously wrapped around the chamber and provides at least two slip rings for conducting electricity through the coil from outside the chamber. At least two corresponding wiper contacts electrically connect said slip rings to a source of DC voltage which in turn is controlled by a controller to continuously adjust the damping torsional resistance of the magneto-rheological fluid. A vibration sensor can be associated with the damper and can be signal connected to the controller to continuously adjust the magnetic field through the magneto-rheological fluid to continuously adjust the torsional shear resistance of the fluid, and thereby fine tune damping of the damper.

9 Claims, 2 Drawing Sheets

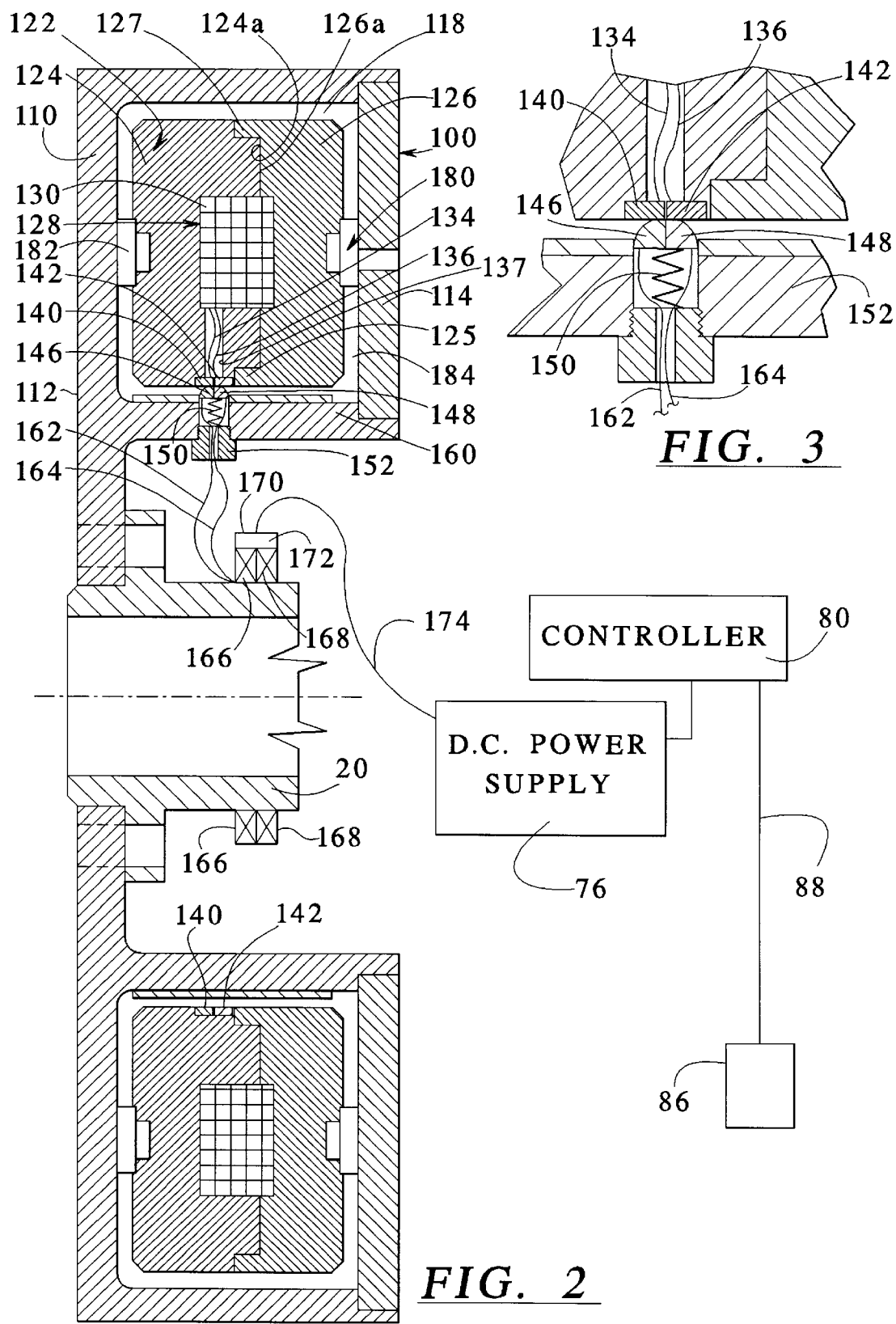

5,829,319

MAGNETO-RHEOLOGICAL TORSIONAL VIBRATION DAMPER

BACKGROUND OF THE INVENTION

The present invention relates to viscous torsional damping of rotating shafts, and in particular controlling viscous damping of rotating shafts using a magneto-rheological fluid within a damper housing which also contains an inertia ring.

Torsional fluid dampers using an inertia ring located within an annular housing and having a viscous shear fluid deployed between the inertia ring and the housing are known such as describing U.S. Pat. Nos. 2,514,136, 3,462,136, 3,603,172, 3,552,230 and 2,724,983.

It is also known to adjust viscous shear forces between a relatively rotating inertia ring and a housing by changing the gap through which a viscous shear fluid acts. This is disclosed for example in U.S. Pat. No. 5,542,507.

Magneto-rheological fluids are fluids which can have their shear or viscosity influenced by exerting an electromagnetic field through the fluid. Such fluids are disclosed for example in U.S. Pat. Nos. 5,452,957; 5,398,917; and 5,277,281. The term rheological fluid is defined as any fluid which exhibits a significant change in its ability to flow, or shear, upon the application of an appropriate energy field, such as electric or magnetic fields. A magneto-rheological fluid is responsive to the presence of a magnetic field for changing its ability to shear or flow. Magneto-rheological fluids ("MR" fluids) are known which are composed of magnetizable particles such as carbonyliron contained in a fluid such as silicone oil, which align under a magnetic field and reduce the ability of the magneto-rheological fluid to shear or flow. The reduction in ability to flow is proportional, over a range, to the strength of the applied magnetic field. An electro-rheological fluid is responsive to electric fields.

SUMMARY OF THE INVENTION

It is an object of the present invention to provide a viscous damping device wherein the internal torsional stiffness and viscous damping can be adjustably maintained. It is an object of the present invention to provide a viscous damping device which can be adjusted to control the damper tuning frequency during operation. It is an object of the present invention to provide a viscous damping device which when mounted on a rotating shaft, can be adjusted during operation to increase or reduce the damping effect of the device.

It is an object of the present invention to provide a damping device which can be adjustably controlled to provide an effective vibration damping device for any operating speed of an engine drive shaft of an internal combustion engine mounted thereto. It is an object of the present invention to provide a viscous damping device which conserves energy.

The objects are inventively achieved with a magneto-rheological fluid viscous damper having an annular chamber containing an inertia ring, and between the inertia ring and an inside wall of the annular chamber is disposed a rheological fluid such as a magneto-rheological fluid, and surrounding the annular chamber holding the magneto-rheological fluid is an outer annular chamber holding a plurality of coils wound effectively around the annular chamber. A mechanism for charging said coils with an adjustable current is provided to vary a magnetic field within said housing. Alternatively, an electro-rheological fluid can be used and the electric field within the housing can be controlled.

The object is further achieved with at least two slip rings applied externally of the outer housing and which are electrically connected to opposite electric ends of the coil, and at least two wiper contacts, each wiper contact conducting electric current through the slip rings and into the coil. The wiper contacts are electrically connected to a power source.

The object is further achieved in that a controller communicates to the power source to adjust the current applied to the coil. The object is further achieved in that a vibration sensor can be applied to the shaft which is being damped, or to other structure related thereto needing to be vibration controlled, the sensor feeding a signal back to the controller for controlling the damping of the absorber, or controlling the tuning frequency of the absorber, to maintain vibration at target limits.

The electric current from a DC power supply is fed to the coils continuously during engine operation and adjusted continuously to vary the electrical current and therefore the magnetic field during engine operation to minimize torsional vibration. The torsional vibration is thus minimized by manipulating the torsional stiffness and damping of the vibration damper by varying the shear resistance of the magneto-rheological fluid.

The controller manipulates the input current to the coils using a suitable control algorithm. This can be accomplished by continuously monitoring the amplitude of torsional vibration at the engine flywheel location or some other suitable location along the engine crankshaft, or on stationary adjacent structure such as a bearing housing, and adjusting the input current to the coils accordingly.

As an alternate embodiment a two piece inertia ring can be provided having a cavity formed between the pieces for holding a coil. Slip rings within the annular chamber transfer electric power from the annular chamber to the inertia ring coil. An external pair of slip rings transfer power from a D.C. source to the annular chamber.

BRIEF DESCRIPTION OF THE DRAWINGS

FIG. 2 is a schematic sectional view through a diameter of an alternate damper arrangement according to the present invention; and FIG. 3 is an enlarged partial schematic view of a portion of FIG. 2.

DETAILED DESCRIPTION OF THE PREFERRED EMBODIMENTS

Figure 1:
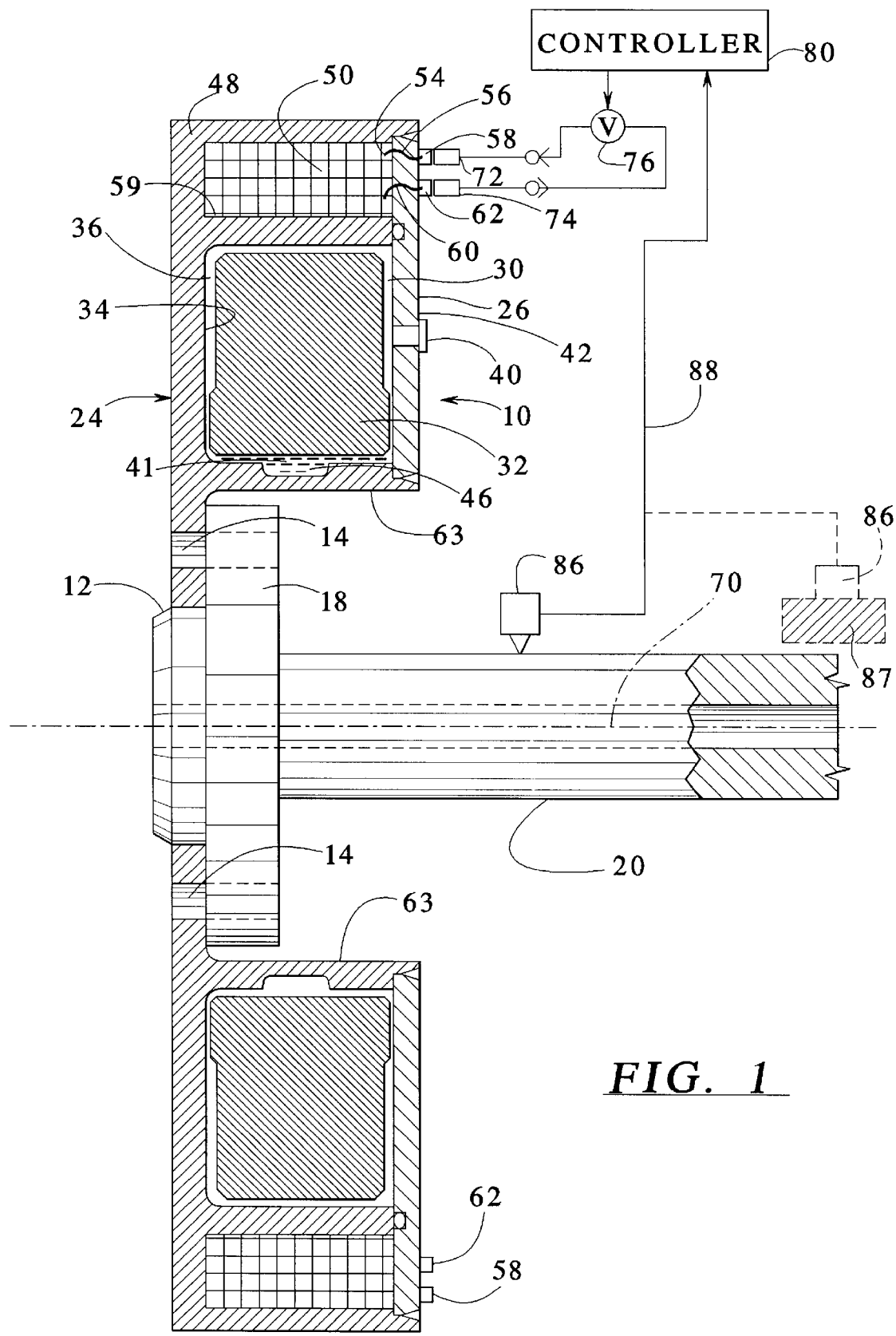
FIG. 1 is a schematic sectional view through a diameter of a damper arrangement according to the present invention.

FIG. 1 illustrates a torsional vibration damper 10 which includes a supporting disc shaped body 12 having a plurality of bolt holes 14 in a bolting pattern for bolting to a flywheel or flange 18 connected to a crankshaft 20. The crankshaft 20 can be associated with an internal combustion engine for example. The damper 10 further includes an annular C-shape housing portion 24 closed by an annular cover plate 26 to form a rectangular chamber 30. Within the annular chamber 30 is captured an inertia ring 32.

Located between the inertia ring 32 and an inside surface 34 of the annular chamber 30 is a gap 36 which is filled with a magneto-rheological fluid such as RHEOACTIVE MR fluid #137A or equivalent or similar magnetic particle based fluids with varying viscosities as required by the application. A screwed plug 40 covers an aperture 42 used for filling the chamber 30 with the magneto-rheological fluid 41. In addition to the gap 36 a reservoir 46 is provided for holding additional fluid. Surrounding the C-shaped channel 24 is a further C-shaped channel 48 which is also closed by the cover 26, defining a second rectangular annular chamber 50. Within this second annular chamber 50 are located plural windings of a coil 54 having one electrical end connected by a lead 56 to a slip ring 58, and a respective other electrical end of the coil 54 connected by a lead 60 to a second slip ring 62. The leads are shown schematically penetrating the cover 26, appropriate sealed openings for the penetration would be provided. The coil 54 can be a wound wire coil wrapped circumferentially around a wall 59 dividing the chamber 30,50. The slip rings 58, 62 are annular in shape and can be mounted for example on the cover plate 26, or on an outside of an inside annular wall 63 of the annular chamber 30 (as shown for example in FIG.2), or elsewhere. The slip rings 58, 62 have a central axis 70 which is collinear with an axis of the shaft 20 and collinear with an axis of the damper 10. A first wiper contact 72 is connected to the first slip ring 58 and a second wiper contact 74 is connected to the second slip ring 62.

The wiper contact 72, 74 are connected by wiring to a source of DC current 76 which in turn is signal connected to a controller 80, the operation of which will be described below.

A vibration sensor 86 is connected to structure for which vibration is required to be controlled or monitored. For example, a vibration sensor 86 can be mechanically coupled to the flywheel 18 or the shaft 20 which is being vibration controlled. Alternatively, the sensor 86 can be connected to stationary structure such as a bearing housing 87 (shown dashed). The sensor 86 communicates by a lead 88 to the controller 80.

The controller 80, by appropriate electronic algorithm increases or decreases the DC current from the source 76 to the coil 54 to change the viscosity or shear force of the magneto-rheological fluid within the damper 10 depending on the amplitude of the vibration sensed by the sensor 86. Thus a vibration control of the shaft 20 can be accomplished in efficient and effective manner using feedback from the vibration sensor 86 and controlling the damping of the damper to change the tuning frequency of the damper 10.

If an electro-rheological fluid ("ER-fluid") is being used, plate electrodes contain the fluid and a high voltage source creates a controllable electric field between the plate electrodes.

FIGS. 2 and 3 illustrate an alternate embodiment of the torsional damper 100 which includes a C-shaped annular chamber 110 connected at its center to (or formed with) an annular disk 112, and closed by an annular cover plate 114. The cover plate provides a fill opening 116 for filling the chamber 110 with magneto-rheological fluid 118. Within the chamber 110 is a two piece inertia ring 122 having a left piece 124 and a right piece 126 as viewed in FIG. 2. The pieces 124 and 126 have correspondingly stepped inner and outer circumferential areas 125, 127 which mate together.

The pieces 124, 126 can be fixed together by welding or fasteners or can be held together functionally by the housing 110 and cover plate via plastic bearings 180, 182, 184.

The two pieces 124, 126 have formed into their respective mating surfaces 124a, 126a an annular cavity 128 which holds an induction coil 130. The coil 130 in this embodiment spins with the inertia ring 122. Two leads 134, 136 penetrate through a bore in the inertia ring 122, through a bore 137 in the left piece 124 for example, to connect to slip rings 140, 142 mounted exposed on an inside circumference of the left piece 124 for example.

As shown enlarged in FIG. 3, electrical contacts 146, 148 are spring loaded into contact with the slip rings 140, 142 respectively, by one or more springs 150 backed by at least one screwed electrical fitting 152 through a wall 160 of the chamber 110. External leads 162, 164 connect the electrical contacts 146, 148 to slip rings 166, 168 mounted onto the shaft 20 being vibration controlled. Wiper contacts 170, 172 connect the slip rings 166, 168 via a cable 174 to the source of DC power 76. The controller 80 and vibration sensor 86 can function identically as described in FIG. 1.

FIG. 2 presents a more compact design eliminating the external chamber 50 of FIG. 1.

Although the present invention has been described with reference to a specific embodiment, those of skill in the art will recognize that changes may be made thereto without departing from the scope and spirit of the invention as set forth in the appended claims.

I claim as my invention:

1. A torsional vibration damping device for a rotating object, said device comprising:

a housing having an annular chamber, said housing adapted for connecting to said rotating object to be torsionally damped;

an annular ring located within said annular chamber and free to rotate with respect thereto, said annular ring dimensioned such that a gap is provided between said annular ring and an inside surface of said annular chamber, said annular ring having two annular pieces and an annular cavity arranged between said two pieces;

a magneto-rheological fluid disposed within said gap;

an electric coil for inducing a select magnetic field within said annular chamber to alter shear resistance of said magneto-rheological fluid, said electric coil arranged to rotate with said annular ring wherein said coil is wrapped around a portion of said annular ring and has a winding axis colinear with an axis of said annular chamber;

a stationary source of electric power; and slip ring means for conducting said electric power from said stationary source to said coil, said slip ring means including annular conductors arranged on said annular ring and electrical contacts wiping said conductors, mounted to said annular chamber.

2. The device according to claim 1, wherein said electric coil is controllable and further comprises a controller for controlling said magnetic field.

3. The device according to claim 2, further comprising a vibration sensor adapted to be applied in vibration communication to the object being damped and having a signal line connected thereto and connected to said controller, said electric coils includes a winding of electric conductors forming a coil mass around said annular chamber and having at least two of said slip ring means for conducting a voltage into said winding to generate said magnetic field, said controller varying said voltage to said coil mass in response to a signal from said signal line.

4. The device according to claim 1, wherein said electric coil comprises a winding of electric conductors forming a coil mass around said annular chamber and having at least two of said slip ring means for conducting a voltage into said winding to generate said magnetic field.

5. The device according to claim 4, wherein said winding of electric conductors are wrapped in a circumferential direction around an outer circumference of said housing.

6. The device according to claim 1, wherein said housing comprises a disc member arranged in an inside area of said annular chamber connected thereto, and wherein said disc member is attached to a flywheel of an internal combustion engine.

7. The device according to claim 1, wherein said coil includes two leads which penetrate from said cavity to an inside diameter of said annular ring, and said annular conductors arranged on said inside diameter connected to said leads, and said electrical contacts being spring loaded toward said annular conductors, and said electric coil comprises further leads from said electrical contacts to further annular conductors which rotate with said annular chamber, and further wiper contacts for transmitting electric power.

8. A torsional fluid damper mounted to a rotating shaft, comprising:

an annular chamber having surrounding walls mounted for rotation with said rotating shaft which is to be damped for torsional vibration;

an annular ring held at least partially within said chamber and free to rotate with respect thereto, said annular ring dimensioned such that a gap is provided between said annular ring and an inside surface of said annular chamber, said annular ring having two annular pieces and an annular cavity arranged between said two pieces;

a magneto-rheological fluid held within said gap between said surrounding walls and said annular ring, said fluid having a chemical composition which is susceptible to change its shear resistance under influence of a select magnetic field applied through the fluid;

an electric coil for inducing said select magnetic field through the fluid, said electric coil surrounding said chamber, said electric coil arranged to rotate with said annular ring wherein said coil is wrapped around a portion of said annular ring and has a winding axis colinear with an axis of said annular chamber; and at least one slip ring and at least one corresponding wiper contact connected to said electric coil and a source of electric power.

9. The damper according to claim 8, further comprising a controller for adjusting the magnitude of said select magnetic field, said controller operatively connected to said electric coil.

* * * * *